Feb. 12, 1929.

C. W. HICKMAN 1,701,498

FLY ESCAPE

Filed Dec. 1, 1927

INVENTOR.
Charles W. Hickman
BY
Rolland S. Trott  ATTORNEY.

Patented Feb. 12, 1929.

1,701,498

UNITED STATES PATENT OFFICE.

CHARLES W. HICKMAN, OF DENVER, COLORADO.

FLY ESCAPE.

Application filed December 1, 1927. Serial No. 236,986.

My invention relates to fly escapes, to be applied to the screens of doors, windows and other openings, and which are adapted to permit flies, which find their way indoors, to escape, and with slight chance of their ever passing back at the same place.

As is well known, the house-fly, when he encounters a screen, invariably crawls upward looking for a way out through the screen. Fly traps have for years been made which operate upon this fact; that is, the fly crawls upward and through a small opening in a screen cone, and finds himself in the trap, and very few flies ever are able to find their way down again through the opening in the screen cone.

The doors and windows of houses are usually covered with screens, especially in summer, these screens being for the purpose of keeping the flies out of the house. But, though this is not the intention, the screens also act to keep within the house any flies that do happen to get in through the doors, unscreened windows, or smaller openings.

It is the object of this invention to provide an escape for flies through the screen, and which there is small chance of any fly using as a means of entering the house.

A further object is to provide such a fly escape of a cheap, simple and effective construction, so that it may be made in great quantities and sold at a profit at a price so low that it will be accepted as a necessary part of any screen equipment for a house.

A further object is to provide such a fly escape, which may be quickly and permanently and securely mounted upon a screen at any time.

In the drawings;—

Figure 1:
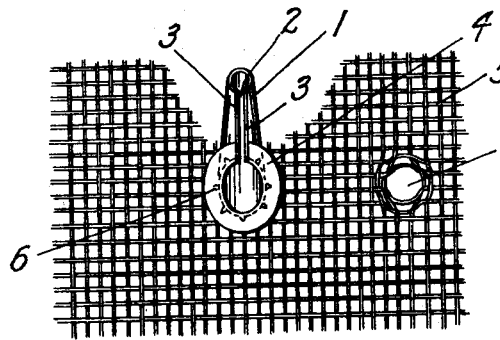
Figure 1 shows a small portion of a screen, partly cut away, with one of my fly escapes in place, and showing also an aperture through the screen, ready for the insertion of another fly escape.
Figure 2:
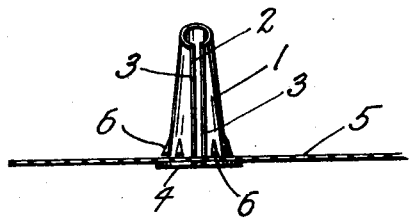
Figure 2 is a view looking down on Figure 1.
Figure 3:
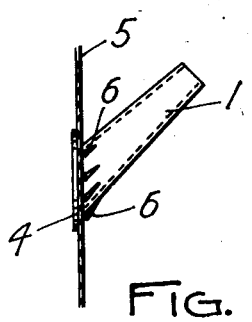
Figure 3 is a side elevation of Figure 1.
Figure 4:
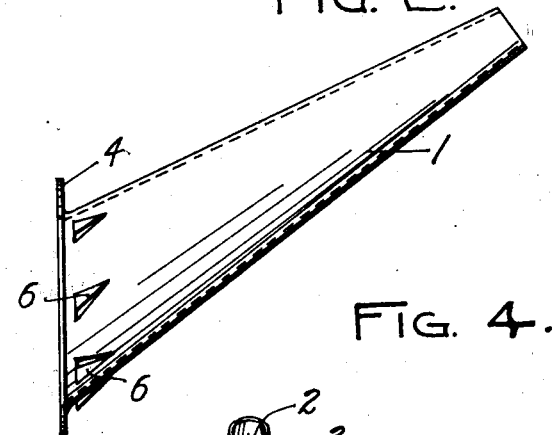
Figure 4 is an enlarged side elevation of the fly escape shown in Figure 1.

The fly escape shown in Figures 1, 2, 3 and 4 is composed of a conical funnel 1, which is rolled from one piece leaving an opening 2 between the two edges 3, the length of the funnel.

The funnel 1 is provided with the integral flange 4 which is adapted to fit against the inside of the screen 5.

The funnel 1 is also provided with a series of indentations on its inner surface which result in tapered wedge locks 6 on the outer surface, the termination of the locks 6 facing the flange 4 being abrupt.

As the funnel 1 is pushed through the hole 7 of the screen 5, the taper of the funnel will enlarge the hole 5 and the spring of the funnel material will maintain a tight fit between the funnel and the screen surrounding the hole 7.

As the funnel is pushed forward the flange 4 comes in contact with the inner side of the screen 5 and the wires surrounding the hole 7 after riding up the tapered wedge locks 6 will snap down between them and the flange 4 and thus lock the fly escape positively in place in the screen.

Figure 7:
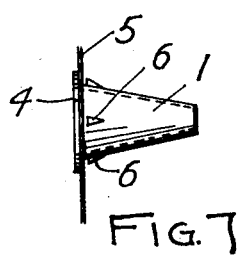
Figure 7 shows a side elevation of another modified form.

The funnel 1 may be made square with the flange 4 as shown in Figure 7, or it may be made so that it will point upward as shown in Figures 1, 2, 3, and 4.

The inner surface of the funnel may be made bright, if desired, so as to help attract the flies toward the escape. Or the entire funnel may be made dark and the light which comes through the slot 2 may be relied upon to furnish enough light to help attract the flies. Turning the funnel upward, as shown in Figures 1, 2, 3 and 4, may aid to some extend in attracting the flies.

But, I seriously doubt if turning the funnel upward, or making it bright inside, will have any great effect upon the number of flies that will pass through any given fly escape in a day.

For, judging from many tests I have made, every fly that once comes to any of the various constructions of my fly escape, instead of looking further, will straightway proceed to crawl in and pass out of the small end of the funnel. And once the fly is out in the open air he flies away.

When flies crawl upon the outer surface of a screen they will crawl right over the very end of my fly escape and seldom if ever will a fly go down into it. This conforms with fly nature as shown by the fly traps mentioned above.

In mounting my fly escape, a pointed stick, a pencil, or some other instrument may be used to make the start of the hole 7 through which the funnel 1 is to be pushed. Once pushed into place till the flange 4 contacts with the inner surface of the screen, and the wires about the funnel 1 snap down off the wedge locks 6, the fly escape is in place for good.

Nothing further need be done to it. A few minutes will suffice to install fly escapes in every screen of a room.

And once in place, they will continue to let flies escape out of the house as long as the screens are used.

Figure 5:
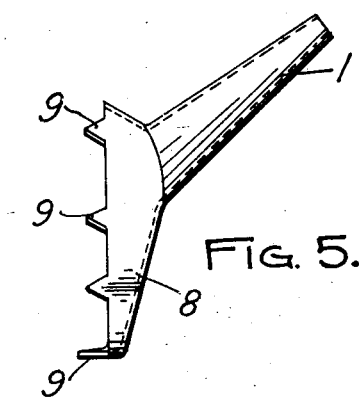
Figure 5 is a side elevation of a modified form of my fly escape.
Figure 6:
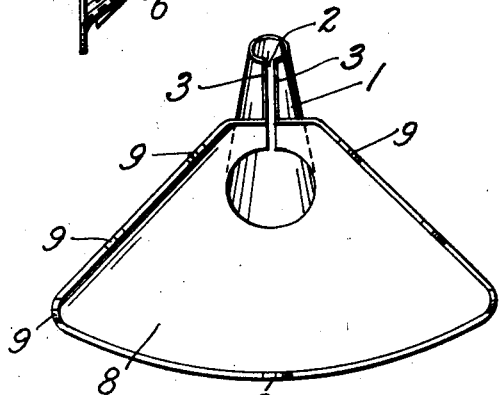
Figure 6 is a view of the modified form shown in Figure 5 as it would appear from within a house, but without the screen.

In the modified form shown in Figures 5 and 6, the funnel 1 is connected with a greatly enlarged funnel 8, which is provided with bending points 9 adapted to pass through the screen and be bent over to hold the fly escape in place on the screen. A hole is preferably cut in the screen, the screen forming the cut edges of the hole being then bent into contact with the funnel 8.

This form permits a much larger opening for the initial entrance of the fly into the escape, which means that each fly may find its way to an escape in a slightly shorter time. But, this form is not as easily installed, nor is the mounting as permanent and solid as in my preferred form shown in Figures 1, 2, 3, and 4.

However, where but one fly escape in each upper corner of a screen is desired, this form might possibly be desired.

Figure 8:
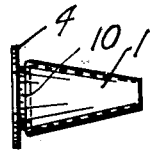
Figure 8 shows a side elevation of another modified form.

In the form shown in Figure 8, the funnel is provided with a groove 10, next to the flange 4, the edges of the groove facing the flange being abrupt so that it will perform the same duty as the tapered wedge locks 6, mentioned above.

This form may be split and provided with the slot 2; and several grooves 10 may be provided if desired.

When this form is pressed through the hole 7 in the screen, the wires of the screen are spread by the tapered funnel till they may snap into the groove 10, the wires then holding the fly escape permanently in place.

Figure 9:
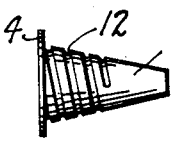
Figure 9 shows a side elevation of another modified form.

In the form shown in Figure 9, the outer surface of the funnel 1 is provided with the spiral groove 12. The funnel is pressed into the hole in the screen to the start of the spiral groove 12, and the fly escape is then twisted so that the wires of the screen, resting in the groove 12, will screw the funnel 1 forward till the flange 4 contacts with the screen.

If desired the groove 12 may extend to the small end of the funnel 1; or a plurality of spiral grooves may be provided upon the outer surface of the funnel 1. Or, instead of spiral grooves, one or several spiral ridges may be provided upon the outer surface of the funnel 1.

In any case the result will be the same in that the fly escape will be finally positioned with its flange 4 against the screen, by a rotation which will advance it to the final position. This form also may be made in the split or slotted design, if desired.

By the use of my fly escape a house may be screened and the screens will then act to keep the flies out of the house, without preventing their escape once they do get in; so that a house equipped with my fly escape will have practically no flies at any time.

I am well aware that my fly escape may be made as a solid funnel, that is, without the slot 2, and without the resulting spring which the slot 2 gives.

But, I prefer the construction as shown since it is simpler, cheaper and easier to make, and since it also provides a spring grip of the fly escape against the wires of the screen.

But, I am aware that there are various modifications other than those I have shown and which would not depart from the essence of my invention, so I do not wish to limit myself narrowly, but what I claim as new, and desire to protect by Letters Patent, is as follows:—

1. In a fly escape adapted to be mounted in an aperture through a fly screen, a funnel having a reduced outer end, a flange at the other end adapted to bear against one side of the screen adjacent the aperture, and means integral with the funnel and protruding from the outer surface thereof adjacent the flange and adapted by contact with the screen adjacent said aperture to prevent the withdrawal of the funnel.

2. In a fly escape adapted to be mounted in an aperture through a fly screen, a funnel having a large and a small end and provided with a slot joining the two ends, the edges of the slot being normally spaced from each other, and means integral with the funnel and adjacent the large end thereof adapted to prevent movement of the funnel in either direction through said aperture by contact with the sides of the screen surrounding the aperture.

3. In a fly escape adapted to be mounted in an aperture through a fly screen, a funnel having a reduced outer end and a flange at the other end and adapted to enter the aperture small end first and to move forward therethrough to a final position spreading the wires of the screen till the inner face of the screen contacts against the flange of the funnel, and means integral with and on the exterior of the funnel and adjacent the flange, adapted to prevent its withdrawal from the aperture by contact with the outer face of the screen.

4. In a fly escape adapted to be mounted in an aperture of a fly screen, a funnel having a reduced outer end and a flange at the other end and provided with integral locking means on the outer surface of the funnel adjacent the flange, the flange and the funnel being split from end to end and thereby forming a light-giving slot whose edges are normally spaced apart, the funnel adapted to enter the aperture in the screen and to spread the wires thereof about it till the inner face of the screen contacts against the flange and the said locking means is adjacent the outer face of the screen, the locking means being adapted to prevent the movement of the funnel through the aperture by contact with the outer face of the screen, and the resilience of the split funnel being adapted to maintain it expanded in close contact with the wires of the screen thereabout.

5. In a fly escape adapted to be mounted in an aperture through a fly screen, a funnel having a reduced outer end and an enlarged opposite end and split from end to end thereby forming a slot for the entire length of the funnel, the edges of the slot being normally spaced from each other, the funnel adapted to enter the aperture small end first and to thereby spread the wires of the screen adjacent thereto, and locking means integral with the funnel adjacent the enlarged end and adapted to co-operate with the pressure due to the resilience of the material of the split funnel and with the two faces of the screen to lock the funnel in place after a predetermined entrance of the funnel into the aperture.

6. In a fly escape adapted to be mounted in an aperture through a fly screen, a funnel having a reduced outer end adapted to enter said aperture, and means integral with the funnel and constituting a portion of the outer surface thereof adapted to prevent the withdrawal of the funnel from the aperture by contact with the screen.

7. In a fly escape adapted to be mounted in an aperture through a fly screen, a funnel provided with a lengthwise slot therethrough and having a reduced outer end adapted to enter said aperture, and means integral with the funnel and constituting a portion of the funnel adapted to prevent the withdrawal of the funnel from the said aperture, the resilience of the material of the funnel being adapted to maintain contact between the funnel and the surrounding wires of the screen.

In testimony whereof I affix my signature.

CHARLES W. HICKMAN.